July 21, 1970    J. O. KING, JR., ET AL    3,521,521
BLIND FASTENER WITH EXPANDABLE THREADED NUT
Filed Sept. 3, 1968    2 Sheets-Sheet 2
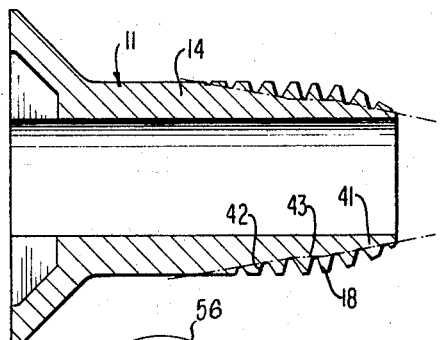
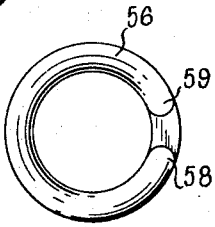
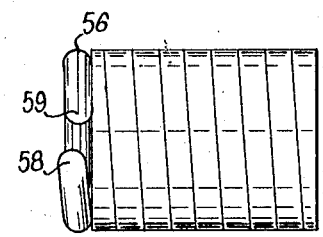
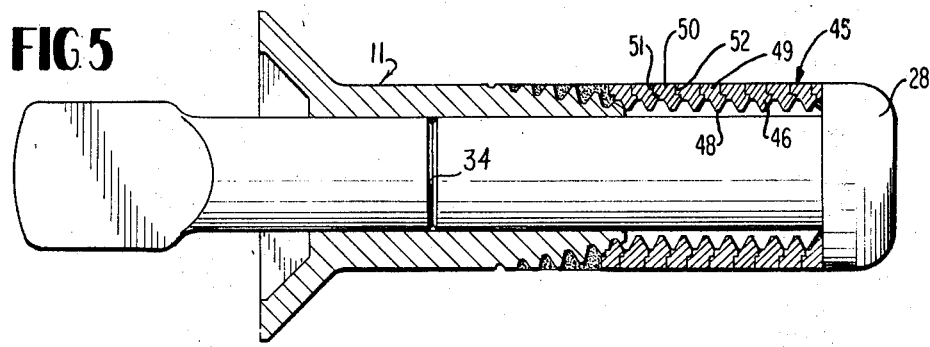
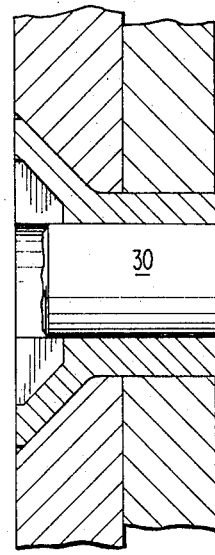
*INVENTOR.*
JOHN O. KING JR.
CHARLES F. MARSCHNER
BY *Jones & Thomas*
ATTORNEYS

United States Patent Office 3,521,521
Patented July 21, 1970

---

3,521,521
BLIND FASTENER WITH EXPANDABLE THREADED NUT
John O. King, Jr., 110 Lake Forest Lane NE., Atlanta, Ga. 30305, and Charles F. Marschner, 595 Wisteria Drive, Marietta, Ga. 30060
Filed Sept. 3, 1968, Ser. No. 756,910
Int. Cl. F16b 39/36
U.S. Cl. 85—74                     16 Claims

---

ABSTRACT OF THE DISCLOSURE

A fastener for connecting together workpieces through aligned apertures in the workpieces from one side of the workpieces, including a tubular, internally threaded nut, a mandrel connected to one end of the nut and extending through the opening of and beyond the nut, and a bolt defining a through bore which is slidable over the mandrel. The nut is approximately the same outside diameter as the shank of the bolt, and is expandable so that it is threadable up over the threads of the shank of the bolt to engage the blind side of the workpieces.

---

BACKGROUND OF THE INVENTION

Blind fasteners, or fasteners for connecting together workpieces from one side of the work have been constructed in various forms, in the past but various difficulties and inadequacies have been present in each type fastener, primarily because of the inaccessibility to the blind side of the workpieces. The types of blind fasteners include: (a) fasteners having an unthreaded expandable sleeve to engage the rear or blind side of the work, which may also include an internally threaded sleeve which expands over an unthreaded tapered hole fitting element to add material to the sleeve; (b) fasteners having a bulbing type sleeve or bolt element with the bolt engaging the blind side of the work; (c) fasteners having a tulip shaped blind head caused by pulling a headed portion of the pin element into the external or bolt element such that it becomes larger than the bolt holes in the work; (d) and fasteners having a nut element insertable through the holes in the workpieces and then rotated to span the hole on the blind side. Types (a) and (c) and (d) are deficient in tension strength as compared to more conventional nut and bolt combinations. Type (b) requires a more sophisticated combination of fastener and tool design and lacks complete reliability although it does provide adequate tensile strength if properly installed. Versions of these four types which require a threaded pin element also lack shear strength.

The purpose of the concept described herein is to achieve a blind fastener closely approximating a conventional nut and bolt in simplicity and ease of installation while retaining the high tension and shear strength associated with non-blind fasteners.

SUMMARY OF THE INVENTION

Briefly described, the present invention comprises a blind fastener for connecting together workpieces through aligned apertures in the workpieces, which includes a bolt having an externally threaded shank of a diameter approximately equal to the diameter of the holes to be formed in the workpieces. A tubular, internally threaded nut of an outside diameter approximately equal to the diameter of the bolt shank is positioned in alignment with and at the end of the bolt. The bolt includes a through bore extending along its longitudinal axis, and a mandrel is connected to the nut and extends back through the opening of the nut and the bore of the bolt to hold the nut and bolt in alignment with each other. The tubular nut expands as it is threaded onto the shank of the bolt so that its diameter increases to engage the blind side of the workpieces. When the nut has been threaded onto the bolt, the mandrel is broken at a point adjacent the head of the bolt, so that the bolt assembly includes a mandrel extending through a major portion of the length of the bore of the bolt.

Thus, it is an object of this invention to provide a blind fastener which includes a bolt and a tubular nut having an outside diameter of approximately equal to the diameter of the openings in the workpieces, and which expands as it is threaded onto the bolt to engage the blind side of the workpieces.

Another object of this invention is to provide a blind fastener which includes an expandable nut which does not have to be turned to engage the bolt when positioned on the blind side of the workpieces, which is small enough to pass through the opening in the workpieces, and which expands as it is threaded onto the shank of a bolt to engage the blind side of the workpieces.

Another object of this invention is to provide a blind fastener which substantially entirely fills the openings in the workpieces and which provides maximum fastening strength for a given opening in the workpieces.

Another object of this invention is to provide a blind fastener which creates a reliable and strong connection, and which is easy to manipulate.

Another object of this invention is to provide a blind fastener which includes an expandable nut constructed in such a manner as to engage substantially the entire threaded portion of a bolt when used with workpieces of varying thickness.

Other objects, features and advantages of the present invention will become apparent upon reading the following specification, when taken in conjunction with the accompanying drawing.

BRIEF DESCRIPTION OF THE DRAWING

FIG. 4 is a side cross sectional view of a bolt having a modified thread construction.

FIG. 5 is a side cross sectional view of a blind fastener similar to FIG. 1, but showing a modified nut construction.

FIG. 6 is a side cross sectional view of the blind fastener and the modified nut, showing the nut engaging the threads of the bolt.

FIG. 7 is an end view of a nut similar to that of FIGS. 5 and 6, but including a split ring connected to the end of the nut.

FIG. 8 is a side view of the nut of FIG. 7.

DESCRIPTION OF THE PREFERRED EMBODIMENTS

Figure 1:
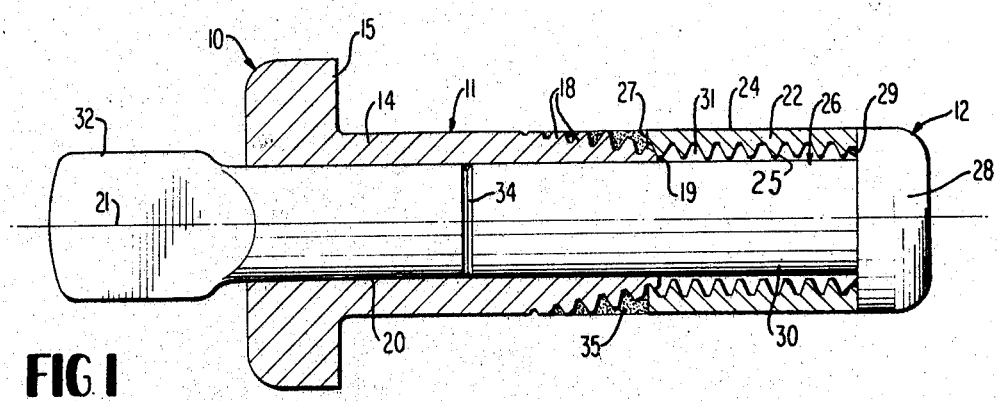
FIG. 1 is a side cross sectional view of the blind fastener showing the nut as it is about to be threaded onto the shank of the bolt.
Figure 2:
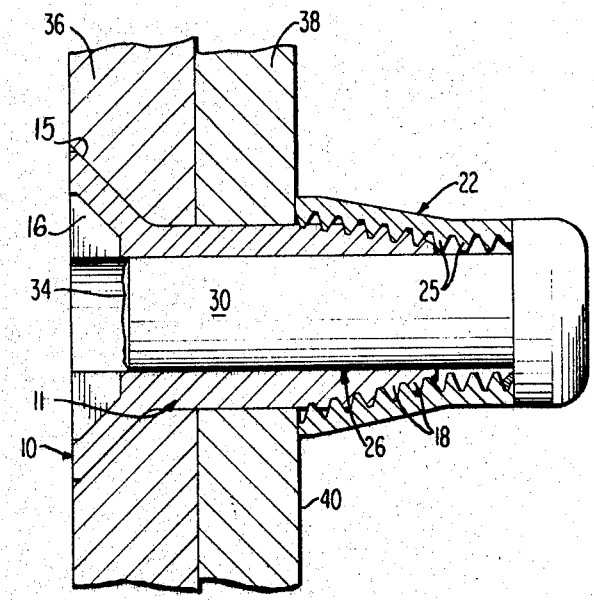
FIG. 2 is a side cross sectional view of the blind fastener, showing the nut as it is threaded onto the shank of the bolt, as used with comparatively thick work pieces.

Referring now more particularly to the drawing, in which like numerals indicate like parts throughout the several views, FIG. 1 shows blind fastener 10 which includes bolt 11 and nut 12. Bolt 11 includes shank 14 and head 15. Head 15 may be constructed in various different shapes, as shown in the drawing. As shown in FIG. 1, head 15 is formed with peripherial flats so it can be gripped with a tool when bolt 11 and nut 12 of blind fastener 10 are being connected together. As is shown in FIG. 2, head 15 can be tapered to fit into a recess in the work piece, and slot 16 can be formed in head 15 to provide gripping surfaces for a tool.

Shank 14 is generally of cylindrical configuration on its outside surface adjacent head 15 and along a major portion of its length. The end of shank 14 remote from head 15 is threaded at 18, and threads 18 taper inwardly toward the end 19 of shank 14. A through-bore 20 extends through both shank 14 and head 15 of bolt 11, and is concentric with the longitudinal axis 21 of bolt 11. Through-bore 20 is of constant diameter throughout its length.

Nut 12 includes tubular member or nut element 22 which is cylindrical and includes outside surface 24 and internal helical threads 25. The outside surface 24 is of a constant diameter, which is a diameter substantially equal to the outside diameter of shank 14 of bolt 11. Mandrel 26 extends entirely through the opening of nut element 22 and through bore 20 of bolt 11. Enlarged head 28 is integrally connected to one end of mandrel 26, and is connected to end surface 29 of nut element 22. Shank 30 of mandrel 26 is of constant diameter throughout the portion of its length within nut element 22 and bolt 11. The diameter of mandrel shank 30 is approximately equal to the inside diameter of through bore 20 of bolt 11, so that a tight sliding fit is maintained between mandrel 26 and bolt 11. The inside diameter of nut element 22 is slightly larger than the diameter of mandrel shank 30, so that a generally annular space 31 is defined between nut element 22 and mandrel shank 30. The end 32 of mandrel shank 30 which protrudes from bolt 11 is flattened after bolt 11 has been slipped over mandrel shank 30, to confine bolt 11 on mandrel shank 30. The flattened protruding end 32 of mandrel shank 30 also provides a gripping surface for a tool for rotating mandrel 26 and nut element 22. Annular groove or break-neck 34 is defined in mandrel shank 30 at a position within through-bore 20 of bolt 11, and displaced from nut element 22.

When blind fastener 10 has been assembled as is shown in FIG. 1, a locking substance 35 may be applied to threads 18 of bolt 11. The locking substance 35 can include various adhesives, for instance of the encapsulated type, or can be a nylon knob or thread deformation, any of which will function to lock nut element 22 on bolt 11.

Figure 3:
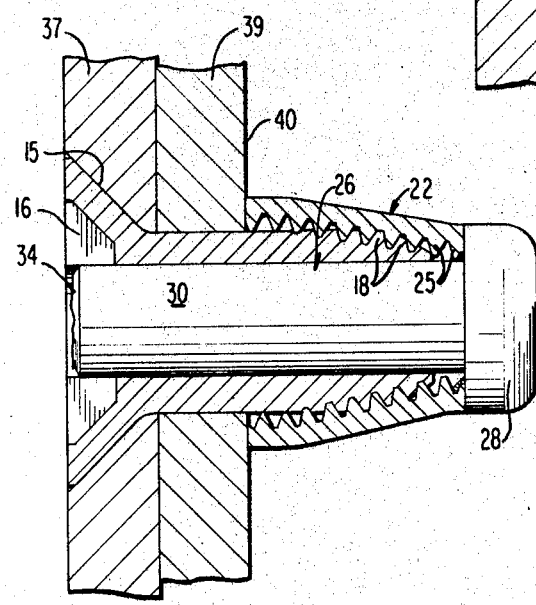
FIG. 3 is a side cross sectional view of the blind fastener, similar to FIG. 2, but showing the fastener utilized with comparatively thin work pieces.

As is shown in FIG. 2, threads 18 of bolt 11 are fewer in number than threads 25 of nut element 22. Nut element 22 is fabricated of a deformable material so that it expands as it is rotated and its threads 25 engage threads 18 of bolt 11. Thus, threads 25 of nut element 22 are sufficient in number to engage all of the threads 18 of bolt 11 when blind fastener 10 is utilized with relatively thick work pieces 36 and 38, as is shown in FIG. 2, or with relatively thin work pieces 37 and 39, as is shown in FIG. 3. Nut element 22 is capable of expanding so that it can ride over the tapered threads 18 onto the unthreaded portion of shank 14 of bolt 11 to engage the inside surface 40 of work pieces 36 and 38, or 37 and 39, as may be necessary.

As is shown in FIGS. 2 and 3, break-neck 34 is spaced away from nut element 22 a distance so that the portion of mandrel shank 30 that remains in bolt 11 extends beyond the abutment or division between work pieces 36 and 38 and 37 and 39, but does not protrude beyond the top of head 15 of bolt 11. Mandrel head 28 is brazed, bonded, soldered or otherwise permanently connected to end surface 29 of nut element 22, so that a rigid connection is maintained between mandrel 26 and nut element 22. Since end 29 of nut element 22 does not have to expand as the remaining portion of nut element 22 rides up over threads 18 of bolt 11, the connection between mandrel 26 and nut element 22 will not be destroyed, and the portion of mandrel shank 30 between break-neck 34 and head 28 will form a permanent part of blind fastener 10.

As is shown in FIG. 4, the thread formation of bolt 11 can vary. The threads 18 of FIG. 4 include tapered sections 41 and 42, and an intermediate non-tapered section 43. With this arrangement, more threads can be formed on bolt shank 14, and the angle of the gripping surface of threads 18 on the non-tapered portion 43 provides a more positive grip with the threads of the nut element.

As is shown in FIG. 5, a nut element 45 can be utilized with blind fastener 10 which is formed of a helical coiled wire, or Heli-coil. The configuration of nut element 45 is substantially the same as nut element 22, and nut element 45 functions in a manner generally similar to nut element 22. The coils 46 of nut element 45 are generally triangular in cross sectional configuration and include an apex 48 which extends inwardly of nut element 45 and forms the threads of the nut element. The base 49 of triangular coils 46 is enlarged and includes an offset portion 50 which forms a projection or protrusion 51 on one side of each coil 46, and a recess or slot 52 on the opposite side. Since coils 46 are lightly wound into abutting relationship with each other, each projection 51 is received in a recess 52 of adjacent coils 46. As is shown in FIG. 6, the arrangement is such that the coils adjacent mandrel head 28 function to support the coils extending outwardly from mandrel head 28 along mandrel shank 30, to urge the apex or threads of coils 46 into engagement with the threads 18 of bolt 11. Thus, coils 46 function to grip threads 18 of bolt 11 with their own individual resiliency, and with the added resiliency of the coils extending back toward mandrel head 28.

It should be noted that coils 46 of nut element 45 are not rigidly connected to their respective next adjacent coils. Thus, when nut element 45 is threaded onto bolt 11, the coils 46 will virtually unwind as the diameter of nut element 45 increases to accommodate the threads of bolt 11. Thus, the deformation of the material in nut element 45 is within the elastic limit of the material in contrast to the permanent, plastic deformation encountered by nut element 22 of FIGS. 1–4. Because of this characteristic, nut element 45 can be reused, if desired. In order that nut element 45 be removable from bolt 11, mandrel shank 30 defines a wedge-shaped slot 55 having its apex or smaller end interseating break neck 34. Thus, when the outer portion of mandrel 30 is broken away, slot 55 is exposed and a tool can be inserted into slot 55 to rotate nut element 45 to back nut element off bolt 11. The elasticity of nut element 45 is such that coils 46 contract back to their original position and nut element 45 can be withdrawn through the openings in the work pieces.

As is shown in FIGS. 7 and 8, the end of coils 46 can have split ring 56 connected thereto. Split ring 56 is connected intermediate its ends 58 and 59 to the end coil of coils 46, and ends 58 and 59 are longitudinally offset from each other and generally follow the curvature of coils 46. When split ring is threaded over the threads of a bolt 11 and onto the unthreaded portion of the bolt, its ends 58 and 59 become more aligned with each other so that split ring 56 lies substantially in one plane. When split ring 56 moves into abutment with the inside surface 40 of the work pieces, it acts as a bearing surface and spreads the forces encountered between nut element 45 and the inside surface 40 of the work pieces over a large area. This prevents the end of the coils 46, which may be relatively sharp, from penetrating or gouging the work pieces.

OPERATION

Blind fasteners 10 will be manufactured so that they are available with bolt 11 inserted over mandrel shank 30 of nut 12, and with protruding end 32 of mandrel shank 30 in a flattened configuration to confine bolt 11 on mandrel shank 30. Thus, when the workman reaches for a blind fastener 10, the fastener is ready to be inserted into the aligned apertures of the work pieces that he desires to connect together. The workman merely inserts the assembled blind fastener 10 through the openings in the work pieces, holds bolt 11 in a static relationship with respect to the work pieces, and rotates the protruding end 32 of mandrel shank 30, which functions to rotate nut element 22 up onto threads 18 of bolt 11. Of course, the workman will normally utilize an automatic tool to perform this operation. After nut element 22 engages the blind side 40 of the work pieces, as is shown in FIGS. 2 and 3, the protruding portion of mandrel shank 30 is broken away from the portion of mandrel shank 30 remaining inside bolt 11. Mandrel shank 30 will break at break-neck 34, which will always be located within bolt 30, yet beyond inside work piece 38 or 39. Thus, the portion of mandrel shank 30 that remains within bolt 11 functions to fill through-bore 20, yet will not protrude beyond head 15 of bolt 11. Because of this construction mandrel shank 30 significantly contributes to the ability of bolt 11 to resist shear forces and deformation of bolt 11.

The annular space 31 between mandrel shank 30 and nut element 22 is sufficient to allow the smaller tapered end 19 of bolt shank 14 to make initial thread engagement with nut element 22. As nut element 22 is rotated onto bolt shank 14, nut element 22 progressively expands to receive threads 18 of bolt 11. By the time end 27 of nut element 22 reaches the blind side 40 of the work pieces, it will have been enlarged an amount sufficient to engage the blind side 40 instead of passing back through the openings in the work pieces. Since the number of threads 25 of nut element 22 is much greater than threads 18 of bolt 11, all of the threads 18 of bolt 11 will be engaged by threads 25 of nut element 22, so that blind fastener 10 forms a connection of known strength characteristics, as determined by the strength of threads 18 of bolt 11. The adhesive material 35 applied to threads 18 of bolt 11 functions to positively lock nut 12 to bolt 11, so that virtually no amount of vibration will function to disconnect blind fastener 10.

Nut element 45 of FIGS. 5 and 6 functions in a manner similar to nut element 22 of FIGS. 1–4, except that coils 46 tend to unwind or rotate with respect to one another as nut element 45 expands to receive the threads of bolt 11. Thus, the material deformation of nut element 45 is not as extensive as it is in nut element 22, and nut element 45 can be reused, if desired.

The materials from which blind fastener 10 can be fabricated can vary, as may be required by the work pieces being connected together, or the manner in which the work pieces are to be used, or in accordance with the strength of the connection to be made between the work pieces. It is anticipated that many suitable materials may be utilized in fabricating blind fastener 10, including most of the known metals or plastics. The adhesive utilized to permanently connect nut 12 with bolt 11 also can vary, and be compatible with the situation in which blind fastener 10 is to be utilized.

Since it is desirable to have the diameter of mandrel shank 30 be approximately equal to the inside diameter of through-bore 20 of bolt 11 so that mandrel shank 30 is effective in assisting bolt shank 14 to resist compression and shear forces, it is anticipated that mandrel shank 30 or the inside surface of through-bore 20 will be coated with a lubricant to assure free rotation of mandrel shank 30 within bolt 11.

It will be obvious to those skilled in the art that many variations may be made in the embodiments chosen for the purpose of illustrating the present invention without departing from the scope thereof as defined by the appended claims.

We claim:

1. A fastener for connecting together work pieces through aligned apertures in the work pieces from one side of the work pieces, said fastener comprising an expandable nut internally threaded throughout substantially its entire length, a mandrel extending from one side of said nut through its opening and connected to the opposite side of said nut, a bolt normally positioned in abutment with said nut and including a head and a shank defining a central opening extending throughout their longitudinal axes, said shank having its outside diameter tapered at its end opposite from said head and including external threads along its tapered length suitable for mating with the threads of said nut, said mandrel including a smooth cylindrical surface extending through the openings of said nut and bolt and terminating in a grasping member for rotating said nut and mandrel with respect to said bolt, said nut having an inside diameter larger than the inside diameter of the opening of said bolt, and the outside diameter of said mandrel being sized so that the surface of said mandrel slidably engages the inside surface of the opening of said bolt.

2. The invention of claim 1 wherein said mandrel defines an annular groove at a position thereon displaced from said nut.

3. The invention of claim 1 wherein said nut is tubular and its outside diameter is approximately equal to the outside diameter of the largest outside diameter of said shank.

4. The invention of claim 1 wherein said expandable nut comprises a helical coiled wire.

5. A nut and mandrel comprising an internally threaded tubular member forming the nut, and said mandrel including a head and a shank having a smooth cylindrical outside surface, said mandrel head integrally connected to one end of said tubular member and said mandrel shank extending through and beyond the other end of said tubular member.

6. The invention of claim 5 wherein said tubular member is fabricated of a deformable material and said mandrel defines a groove extending about its perimeter and normal to its longitudinal axis, said groove being displaced from said tubular member.

7. The invention of claim 5 wherein said tubular member comprises a resilient closely wound helical coiled wire.

8. The invention of claim 7 wherein the outer surface of the tubular member formed by the coiled wire is substantially cylindrical.

9. The invention of claim 7 wherein the cross sectional shape of the wire is generally triangular with the apex of the triangle extending inwardly of the tubular member formed by the wire.

10. The invention of claim 9 wherein the base of the triangle includes an offset portion which forms a recess on one side of the triangle and a protrusion on the opposite side of the triangle so that the protrusion of the wire extends into the recess of the wire on adjacent coils of the wire.

11. A nut comprising an internally threaded tubular member, a mandrel connected to one end of said tubular member and extending through and beyond said tubular member, said tubular member comprising a resilient closely wound helical coiled wire, and a split ring connected to the other end of said tubular member.

12. A fastener assembly for connecting together work pieces through aligned apertures in the work pieces from one side of the work pieces, said fastener comprising a nut and a bolt, said nut including an internally threaded tubular member and a mandrel connected at one of its ends to one end of said tubular member and including a smooth cylindrical surface extending through and beyond the other end of said tubular member, said bolt including a head and a shank and defining an axial through bore of a diameter substantially equal to the diameter of the cylindrical surface of said mandrel, said shank having an outside diameter approximately equal to the outside diameter of said nut and defining inwardly tapered helical threads at its end remote from its head.

13. The invention of claim 12 and wherein said mandrel includes a slot extending across its longitudinal axis for receiving a rotating tool for rotating said mandrel when a portion of the mandrel has been broken away to expose the slot.

14. The invention of claim 12 wherein said head includes a tool receiving slot for holding said bolt as the mandrel and the tubular member are rotated.

15. The invention of claim 12 wherein there are more threads in the tubular member than on the shank of the bolt.

16. The invention of claim 12 wherein the threads of the shank are tapered at more than one angle.

References Cited

UNITED STATES PATENTS

| | | | |
|---|---|---|---|
| 2,051,066 | 8/1936 | Anderson | 85—73 |
| 2,099,678 | 11/1937 | Curtis | 85—74 |
| 2,516,554 | 7/1950 | Coyne | 85—73 |
| 2,672,070 | 3/1954 | Forster. | |
| 2,697,375 | 12/1954 | Brisack | 85—73 |
| 2,795,989 | 6/1957 | Koenig | 85—73 |
| 2,863,351 | 12/1958 | Vaughn | 85—73 |
| 2,868,056 | 1/1959 | La Torre | 85—73 |
| 2,971,425 | 2/1961 | Blakeley | 85—73 |
| 3,078,002 | 2/1963 | Rodgers | 85—73 |
| 3,307,444 | 3/1967 | Money | 85—74 |

FOREIGN PATENTS 145,722  3/1952  Australia.

MARION PARSONS, Jr., Primary Examiner

U.S. Cl. X.R.

85—78; 151—14